UNITED STATES PATENT OFFICE.

CARL BOSCH, ALWIN MITTASCH, AND CHRISTIAN SCHNEIDER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

HYDROGENIZATION AND DEHYDROGENIZATION OF CARBON COMPOUNDS.

1,215,335.     Specification of Letters Patent.     Patented Feb. 13, 1917.

No Drawing.     Application filed June 4, 1914. Serial No. 843,024.

*To all whom it may concern:*

Be it known that we, CARL BOSCH, ALWIN MITTASCH, and CHRISTIAN SCHNEIDER, citizens of the German Empire, residing at Ludwigshafen-on-the-Rhine, Germany, have invented new and useful Improvements in the Hydrogenization and Dehydrogenization of Carbon Compounds, of which the following is a specification.

Our invention relates to the hydrogenization and dehydrogenization in the presence of a catalytic agent of compounds containing carbon, and to catalytic mixtures by means of which the said hydrogenization and dehydrogenization can be carried out rapidly, with certainty and at comparatively low temperatures. We have discovered that these advantages can be obtained by employing as the catalytic agent an intimate mixture of a common metal, in particular iron, nickel, cobalt and copper (which we hereinafter refer to as the catalytic metal), with a phosphate of an alkaline earth metal. These alkaline earth phosphates which promote the activity of the catalytic metal we refer to hereinafter as promoters.

In order to obtain the advantages of this invention it is necessary to effect an intimate mixture of the catalytic metal and the promoter. If calcium phosphate be employed as the promoter the oxid or carbonate of the catalytic metal can be mixed with such solid calcium phosphate and the mixture thereupon be heated and reduced. A still better method consists for instance, in taking an insoluble salt, such as the carbonate, or an oxid of the catalytic metal, and adding to it a solution of a calcium salt, for instance, calcium nitrate, and then to add the necessary quantity of phosphoric acid, either as such or in the form of ammonium phosphate, alkali metal phosphate or the like, in order to convert the calcium into phosphate. It is preferred to employ basic phosphates, such for instance, as tri-calcium phosphate, as promoters.

It is particularly advantageous for the purpose of preparing a very active contact mass to prepare the catalytic metal from carbonaceous salts or mixtures of salts thereof, for instance, from carbonates or from formiates. It is further often useful to add to the mixture, bodies of inorganic or organic nature, which act either as carriers, or as binding agents, or which increase the porosity of the contact mass. We mention, for instance, asbestos, charcoal and pumice. It is advisable, however, to avoid the introduction of bodies such as chlorin, sulfur, arsenic and lead, which may in the elementary form act as contact poisons, although the new contact mixtures according to the present invention are not so sensitive to the action of poisons as are the pure metals.

The catalytic metal can be employed either in a state of fine division, or in a more compact form, such as wire netting, or wool, or in sheet form.

The proportion of the components employed in the catalytic mixture may be considerably varied.

In those cases in which reduction has to be resorted to in order to obtain the catalytic metal, such reduction is preferably carried out by means of pure hydrogen, or other suitable agent at as low a temperature as possible, and if the catalytic mixture after having been reduced with hydrogen, has to be exposed to the air, it is generally advisable previously to drive away any excess of hydrogen by passing an indifferent gas such as carbon dioxid over the mixture and thus to avoid even superficial oxidation of the metal.

The catalytic mixtures according to this invention can be used for the hydrogenization and dehydrogenization of compounds containing carbon and are of particular value for the hardening of fats and fatty acids, but they can also be used for other purposes.

The catalytic reaction according to this invention can be carried out either at ordinary pressure, or under increased pressure, for instance, above 50 atmospheres and in most cases proceeds sufficiently rapidly at temperatures below 180° C.

The following example will serve to illustrate further the nature of this invention, which however, is not confined to this example. The parts are by weight.

Example.

Suspend 5 parts of nickel carbonate in a solution of 1.3 parts of calcium nitrate, and then precipitate the calcium by the addition of 0.7 parts of ammonium phosphate ($NH_4H_2PO_4$). Then filter, wash well, dry and reduce with hydrogen at about 350° C. Then employ the mass in the reduction of cottonseed oil by means of hydrogen at about 130° C.

Now what we claim is:—

1. A catalytic agent for use in the hydrogenization and dehydrogenization of compounds containing carbon, comprising an intimate mixture of a common metal acting as a catalyzer for the said reactions and a phosphate of an alkaline earth metal.

2. A catalytic agent for use in the hydrogenization and dehydrogenization of compounds containing carbon, comprising an intimate mixture of a metal of the iron group and a phosphate of an alkaline earth metal.

3. A catalytic agent for use in the hydrogenization and dehydrogenization of compounds containing carbon, comprising an intimate mixture of nickel and a phosphate of an alkaline earth metal.

4. A catalytic agent for use in the hydrogenization and dehydrogenization of compounds containing carbon, comprising an intimate mixture of nickel and calcium phosphate.

In testimony whereof we have hereunto set our hands in the presence of two subscribing witnesses.

CARL BOSCH.
ALWIN MITTASCH.
CHRISTIAN SCHNEIDER.

Witnesses:
 CH. BECK,
 J. ALEC. LLOYD.